United States Patent
Yan et al.

(10) Patent No.: US 12,425,818 B2
(45) Date of Patent: Sep. 23, 2025

(54) SYSTEMS AND METHODS FOR NETWORK USAGE MONITORING

(71) Applicant: Verizon Patent and Licensing Inc., Basking Ridge, NJ (US)

(72) Inventors: Lixia Yan, Basking Ridge, NJ (US); Barry F. Hoffner, Bridgewater, NJ (US); Javier A. Ferro, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 398 days.

(21) Appl. No.: 18/049,710

(22) Filed: Oct. 26, 2022

(65) Prior Publication Data

US 2024/0147199 A1    May 2, 2024

(51) Int. Cl.
*H04W 4/24* (2024.01)
*H04M 15/00* (2006.01)
*H04W 24/08* (2009.01)

(52) U.S. Cl.
CPC ............ *H04W 4/24* (2013.01); *H04M 15/58* (2013.01); *H04W 24/08* (2013.01)

(58) Field of Classification Search
CPC ........ H04W 4/24; H04W 24/08; H04M 15/58
USPC ...................................................... 455/408
See application file for complete search history.

(56) References Cited

U.S. PATENT DOCUMENTS

| | | | |
|---|---|---|---|
| 10,904,021 B1* | 1/2021 | Lagha | H04M 15/852 |
| 11,128,716 B1* | 9/2021 | Yan | H04M 15/854 |
| 11,425,262 B2* | 8/2022 | Kaki | H04M 15/00 |
| 11,886,315 B2* | 1/2024 | Gupta | G06F 9/5072 |
| 11,985,573 B1* | 5/2024 | Engelhart | H04W 4/24 |
| 12,089,090 B2* | 9/2024 | Dhammawat | H04W 28/20 |
| 2013/0122860 A1* | 5/2013 | Dhruva | H01Q 1/38 |
| | | | 455/406 |
| 2016/0373589 A1* | 12/2016 | Chai | H04M 15/66 |
| 2019/0166258 A1* | 5/2019 | Yan | H04L 12/1403 |
| 2021/0075915 A1* | 3/2021 | Qiao | H04W 60/06 |
| 2021/0250446 A1* | 8/2021 | Qiao | H04W 4/24 |
| 2021/0306937 A1* | 9/2021 | Hua | H04W 8/183 |
| 2024/0276300 A1* | 8/2024 | Xu | H04W 28/0967 |

FOREIGN PATENT DOCUMENTS

CA      3080572 A1 * 11/2020 .......... H04W 40/246

\* cited by examiner

*Primary Examiner* — Mong-Thuy T Tran (57) ABSTRACT

A method may include receiving, by a charging function (CHF), a data usage monitoring request associated with use of an application, wherein the data usage monitoring request identifies a data usage threshold. The method may also include transmitting, by the CHF and to a session management function (SMF) or a user plane function (UPF), a message notifying the SMF or UPF of the data usage threshold. The method may further include receiving, from the SMF or UPF, a notification that the data usage threshold has been reached, and sending, by the CHF, a message to a network exposure function (NEF) indicating that the data usage threshold has been reached.

20 Claims, 6 Drawing Sheets

SYSTEMS AND METHODS FOR NETWORK USAGE MONITORING

BACKGROUND INFORMATION

Data usage monitoring in networks is often needed by third parties that are not associated with the service provider of the network. For example, a third party providing an application that is accessed via the network may allot a certain amount of data usage to users of the application and the third party may subsidize or pay for that data usage. In such cases, the third party may receive a notification of data usage from the network service provider.

DETAILED DESCRIPTION OF EXAMPLE EMBODIMENTS

The following detailed description refers to the accompanying drawings. The same reference numbers in different drawings may identify the same or similar elements.

Implementations described herein provide for data usage monitoring associated with particular applications and reporting the data usage to third parties associated with the applications. In some implementations, the third party associated with a particular application may be paying for or subsidizing data usage for users of the particular application. In exemplary implementations, one or more network elements in a core network may provide a message to a charging function network element that identifies a data usage threshold. The one or more network elements may also provide a notification to the charging function when the data usage threshold has been met. The charging function network element may then forward the notification regarding the data usage threshold being met to an application function network element. In this manner, the same network element (e.g., the charging function network element or a number of distributed charging function network elements) may be aware of the data usage threshold, as well as provide a notification to the appropriate application function and store charging records associated with the data usage threshold. As a result, a reliable and efficient mechanism for tracking data usage is provided and discrepancies in data usage monitoring may be avoided.

Figure 1:
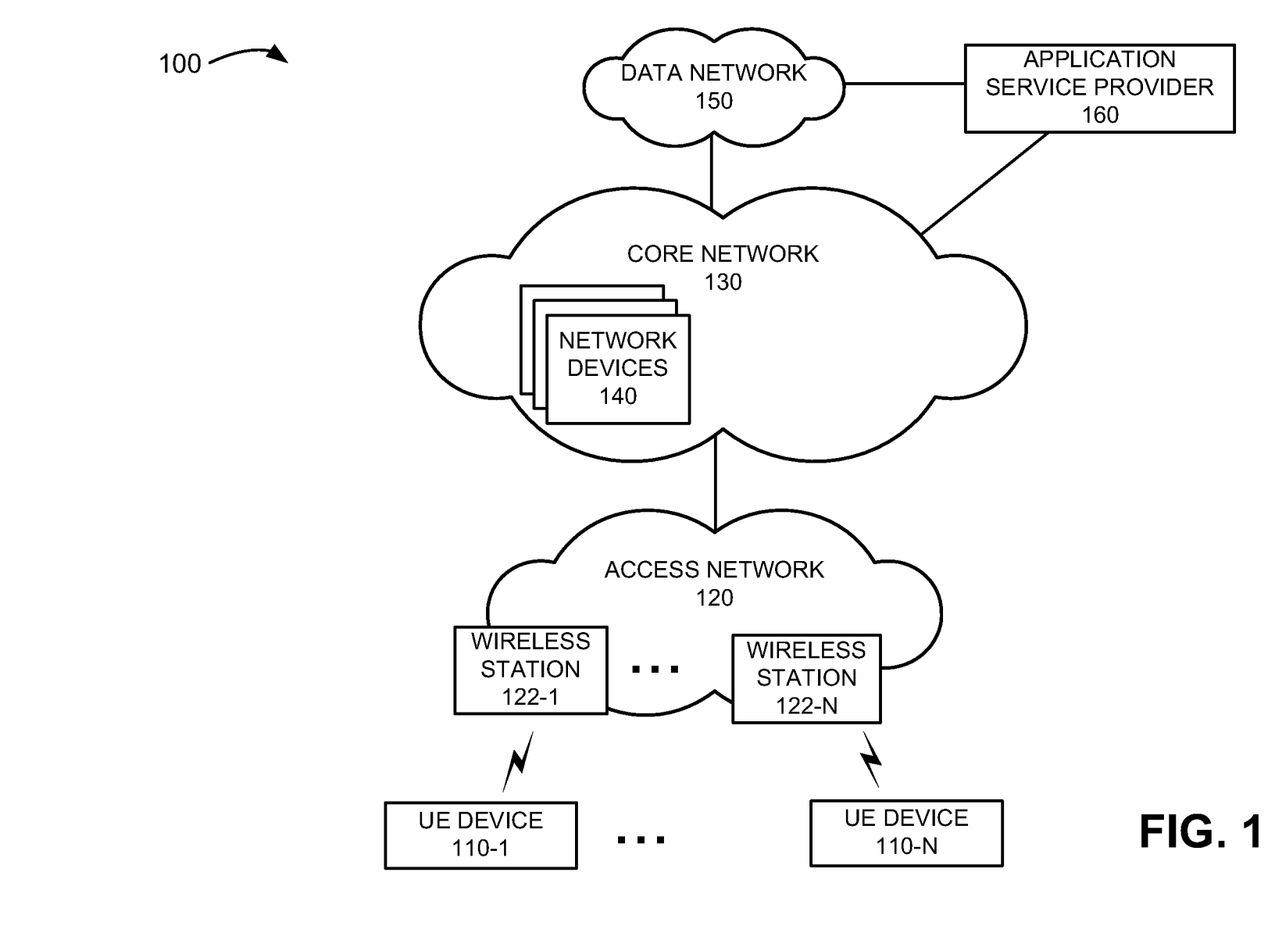
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes user equipment (UE) devices 110-1 through 110-N, access network 120, wireless stations 122-1 through 122-N, core network 130, network devices 140, data network 150 and application service provider 160.

UE devices 110-1 and 110-N (referred to herein individually as UE device or UE 110, and collectively as UE devices or UEs 110) may include any computing device, such as a personal computer (PC), a laptop computer, a server, a tablet computer, a notebook, a Chromebook®, a mobile device, such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, an Internet of Things (IoT) device, a machine type communication (MTC) device, etc., that includes communication functionality. UE device 110-1 may connect to access network 120 via wireless station 122-1 and UE device 110-N may connect to access network 120 via wireless station 122-N. UE devices 110 may also connect to other devices in environment 100 via other techniques, such as wired, wireless, optical connections or a combination of these techniques. UE device 110 and the person associated with UE device 110 (e.g., the party holding or using UE device 110) may be referred to collectively as UE device 110 or UE 110 in the description below.

Access network 120 may provide access to core network 130 for wireless devices, such as UE devices 110. Access network 120 may enable UE device 110 to connect to core network 130 for Internet access, non-Internet Protocol (IP) data delivery, cloud computing, mobile telephone service, Short Message Service (SMS) message service, Multimedia Message Service (MMS) message service, and/or other types of data services. Access network 120 may provide access to core network 130, a service or application layer network, a cloud network, a multi-access edge computing (MEC) network, a fog network, etc. Furthermore, access network 120 may enable a device in core network 130 to exchange data with UE device 110 using a non-IP data delivery method such as Data over Non-Access Stratum (DoNAS).

Access network 120 may also include a Fifth Generation (5G) access network or another advanced network, such as a Fourth Generation (4G) Long Term Evolution (LTE) access network. Additionally, access network 120 may include functionality such as the functionality of a millimeter (mm) Wave Radio Access Network (RAN). Access network 120 may also include: support for advanced or massive multiple-input and multiple-output (MIMO) antenna configurations (e.g., an 8×8 antenna configuration, a 16×16 antenna configuration, a 256×256 antenna configuration, etc.); support for cooperative MIMO (CO-MIMO) configurations; support for carrier aggregation; relay stations; Heterogeneous Networks (HetNets) of overlapping small cells and macrocells; Self-Organizing Network (SON) functionality; machine type communication (MTC) functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless stations 122 (referred to collectively as wireless stations 122 and individually as wireless station 122) may be included in access network 120. Each wireless station 122 may service a number of UE devices 110 and/or other user devices when the particular device is within radio frequency range of wireless station 122. In one implementation, wireless station 122 may include 5G base station (e.g., a next generation NodeB (gNB)) that includes one or more radio frequency (RF) transceivers. For example, wireless station 122 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. In other implementations, wireless station 122 may also include a 4G base station (e.g., an evolved NodeB (eNodeB)) or a Sixth Generation (6G) base station that communicates wirelessly with UEs 110 located within the radio frequency range of wireless station 122.

Core network 130 may include one or more wired, wireless and/or optical networks that are capable of receiving and transmitting data, voice and/or video signals. In an exemplary implementation, core network 130 may be associated with a telecommunications service provider (e.g., a service provider providing cellular wireless communication services and wired communication services) and may manage communication sessions of UE devices 110 connecting to core network 130 via access network 120. Core network 130 may include one or multiple networks of different types and technologies. For example, core network 130 may be implemented to include a next generation core (NGC) network for a 5G network, an Evolved Packet Core (EPC) of an LTE or LTE Advanced network, a 6G network, and/or a legacy core network. Core network 130 may provide packet-switched services and wireless IP connectivity to various components in environment 100, such as UE devices 110, to provide, for example, data, voice, and/or multimedia services.

Core network 130 may include various network devices 140. Depending on the implementation, network devices 140 may include 5G core network components (e.g., a User Plane Function (UPF), an Access and Mobility Management Function (AMF), a Session Management Function (SMF), a Unified Data Management (UDM) function, a Unified Data Repository (UDR), a Policy Control Function (PCF), a Charging Function (CHF), a network exposure function (NEF), an application function (AF), etc.), 4G core network components (e.g., a Serving Gateway (SGW), a Packet data network Gateway (PGW), a Mobility Management Entity (MME), a Home Subscriber Server (HSS), a Policy Charging and Rules Function (PCRF) etc.), or another type of core network components (e.g., future 6G network components). In other implementation, network devices 140 may include combined 4G and 5G functionality, such as a session management function with PGW-control plane (SMF+PGW-C) and a user plane function with PGW-user plane (UPF+PGW-U).

Data network 150 may include, for example, a packet data network. In an exemplary implementation, UE device 110 may connect to data network 150 via core network 130. Data network 150 may also include and/or be connected to a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks.

Application service provider 160 may include one or more computer devices and/or servers that store applications (referred to herein as "apps") and provide the applications and services associated with the applications to users, such as UE devices 110, via core network 130 and access network 120. For example, application service provider 160 may provide a particular application (e.g., Facebook, YouTube, etc.) accessed by UE device 110 via core network 130. In some implementations, application service provider 160 may also pay for or subsidize network usage associated with usage of a particular application, as described in detail below.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UE devices 110, wireless stations 122 and application service provides 160, as well as multiple access networks 120, core networks 130 and data networks 150. Environment 100 may also include elements, such as gateways, monitoring devices, network elements/functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
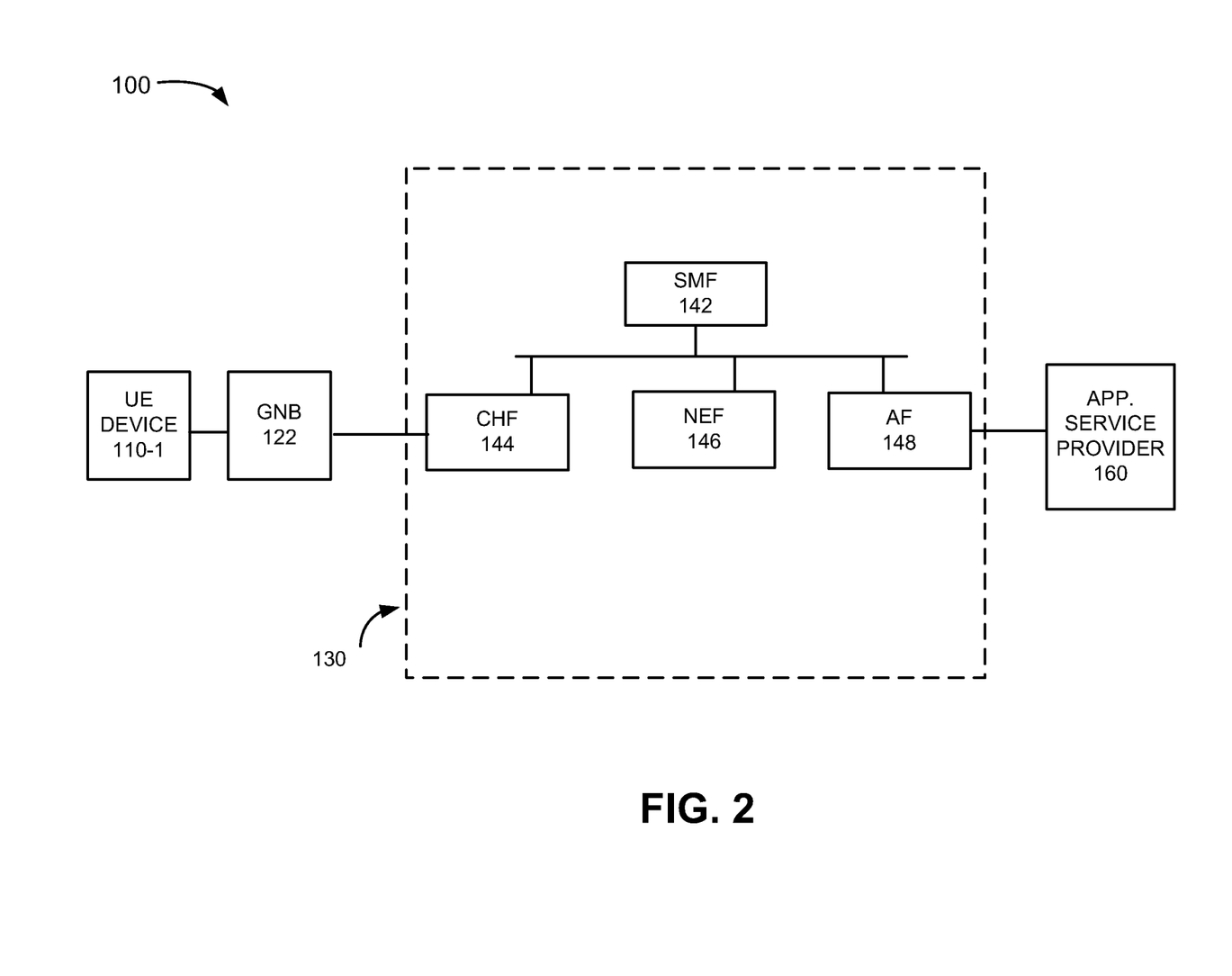
FIG. 2 is a block diagram of components implemented in the environment of FIG. 1 in accordance with an exemplary implementation.

FIG. 2 illustrates a portion of environment 100, including elements implemented in core network 130 in accordance with an exemplary implementation. Referring to FIG. 2, network devices 140 in core network 130 include session management function (SMF) 142, charging function (CHF) 144, network exposure function (NEF) 146, application function (AF) 148. It should be understood that core network 130 may include other elements/functions, such as an AMF, UPF, UDM, UDR, PCF, etc., and/or differently arranged elements. Environment 100 also includes UE device 110-1, gNB 122 and application service provider 160.

As illustrated in FIG. 2, UE device 110-1 may connect to core network 130 via wireless station 122, shown in FIG. 2 as gNB 122. Application service provider 160 may also connect to elements in core network 130, such as AF 148, to provide access to an application.

SMF 142 may perform session establishment, session modification, and/or session release, perform Internet Protocol (IP) address allocation and management, perform Dynamic Host Configuration Protocol (DHCP) functions, perform selection and control of a UPF (not shown), configure traffic steering at the UPF to guide the traffic to the correct destinations, terminate interfaces toward a PCF (not shown), perform lawful intercepts, charge data collection, support charging interfaces, control and coordinate of charging data collection, terminate session management parts of Non-Access Stratum (NAS) messages, perform downlink data notification, manage roaming functionality, and/or perform other types of control plane processes for managing user plane data.

CIF 144 may perform data monitoring, charging and/or billing functions for core network 130. For example, CHF 144 may generate a charging record for UE device 110 based on data flow information associated with UE device 110. In an exemplary implementation, CIF 144 may receiving information identifying particular data usage thresholds for various applications, and inform other network elements, such as NEF 146 and/or AF 148 when a data usage threshold has been met. CIF 144 may also store records associated with data usage thresholds to allow the data usage to be easily verified at a later time, as described in more detail below.

NEF 146 may expose capabilities and events to other network functions (NFs), including third party NFs, application functions (AFs), edge computing NFs, and/or other types of NFs. Furthermore, NEF 146 may secure provisioning of information from external applications to core network 130, translate information between core network 130 and devices/networks external to core network 130, support a Packet Flow Description (PFD) function, and/or perform other types of network exposure functions.

AF 148 may provide services associated with a particular application, such as, for example, an application provided by application service provider 160. AF 148 may also provide services associated with a particular application for influencing traffic routing, an application for accessing NEF 146, an application for interacting with a policy framework for policy control, and/or other types of applications.

Environment 100 illustrated in FIG. 2 may include additional elements and/or NFs that are not illustrated. Such elements and/or NFs may provide security, authentication and authorization, network polices, subscriber profiles, network slicing, and/or facilitate the operation of core network 130. It should also be understood that functions described as being performed by various elements in FIG. 2, including elements in core network 130, may be performed by other elements/functions in other implementations.

Figure 3:
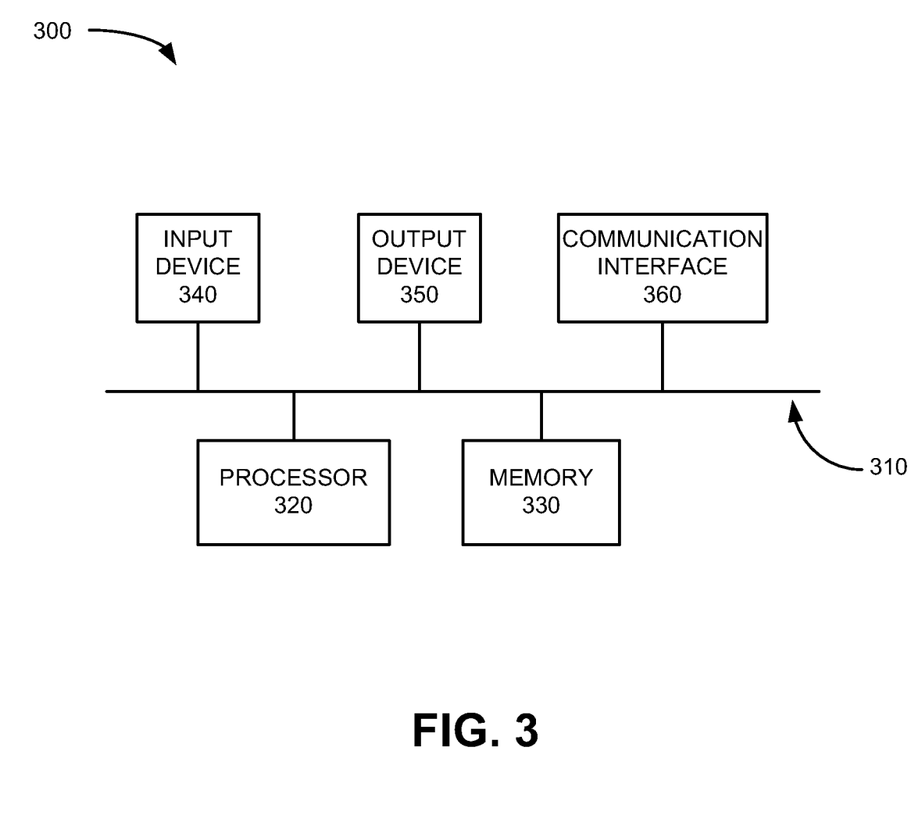
FIG. 3 illustrates logic components implemented in one or more of the devices illustrated in FIGS. 1 and 2 in accordance with an exemplary implementation.

FIG. 3 illustrates an exemplary configuration of a device 300. One or more devices 300 may correspond to or be included in devices in environment 100, such as UE device 110, wireless station 122, network devices 140, such as SMF 142, CIF 144, NEF 146, AF 148, application service provider 160 and other devices included in environment 100. Referring to FIG. 3, device 300 may include bus 310, processor 320, memory 330, input device 340, output device 350 and communication interface 360. The exemplary configuration illustrated in FIG. 3 is provided for simplicity. It should be understood that device 300 may include more or fewer components than illustrated in FIG. 3. Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display may act as both an input device 240 and an output device 350.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
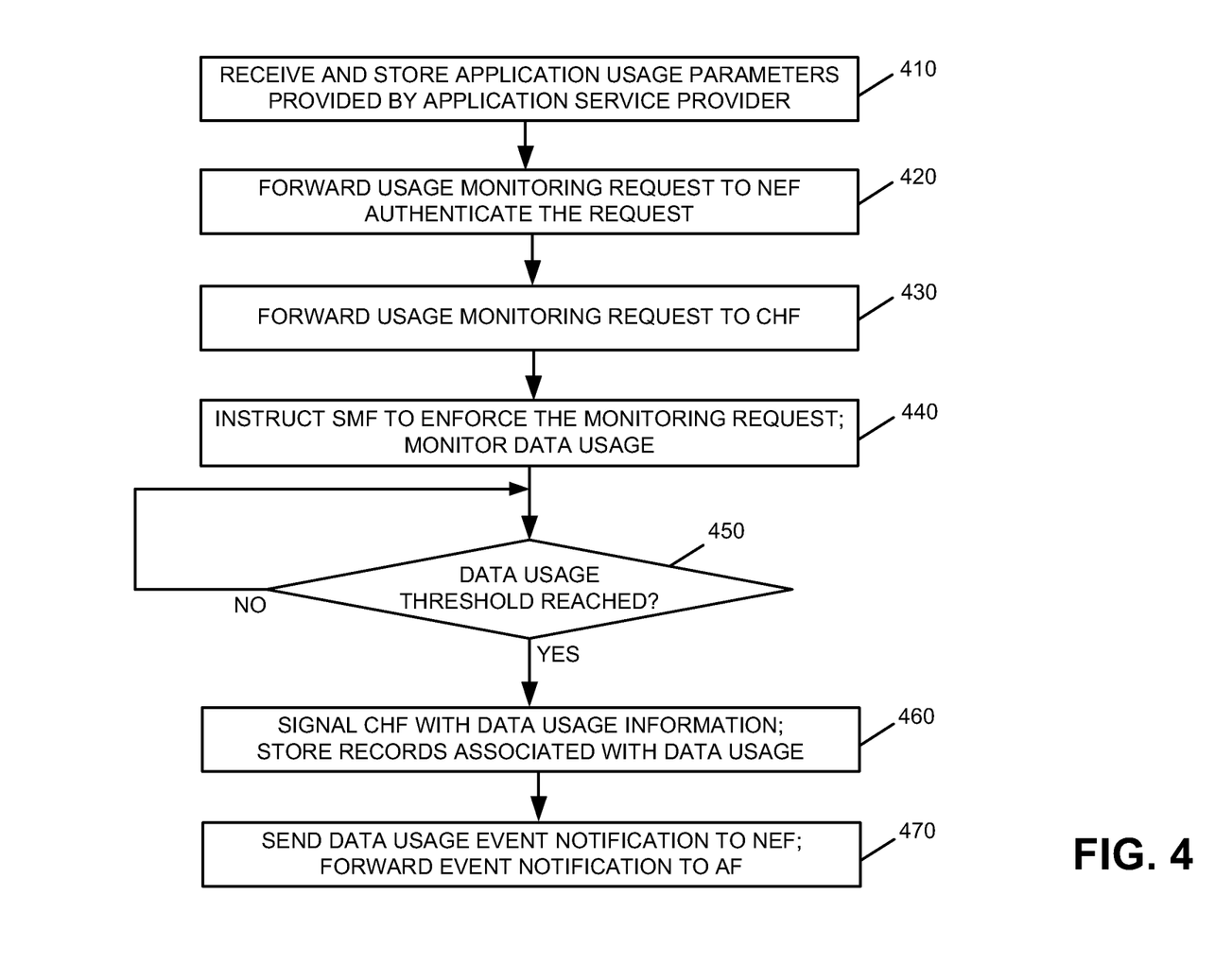
FIG. 4 is a flow diagram illustrating processing associated with data usage monitoring in accordance with an exemplary implementation.
Figure 5A:
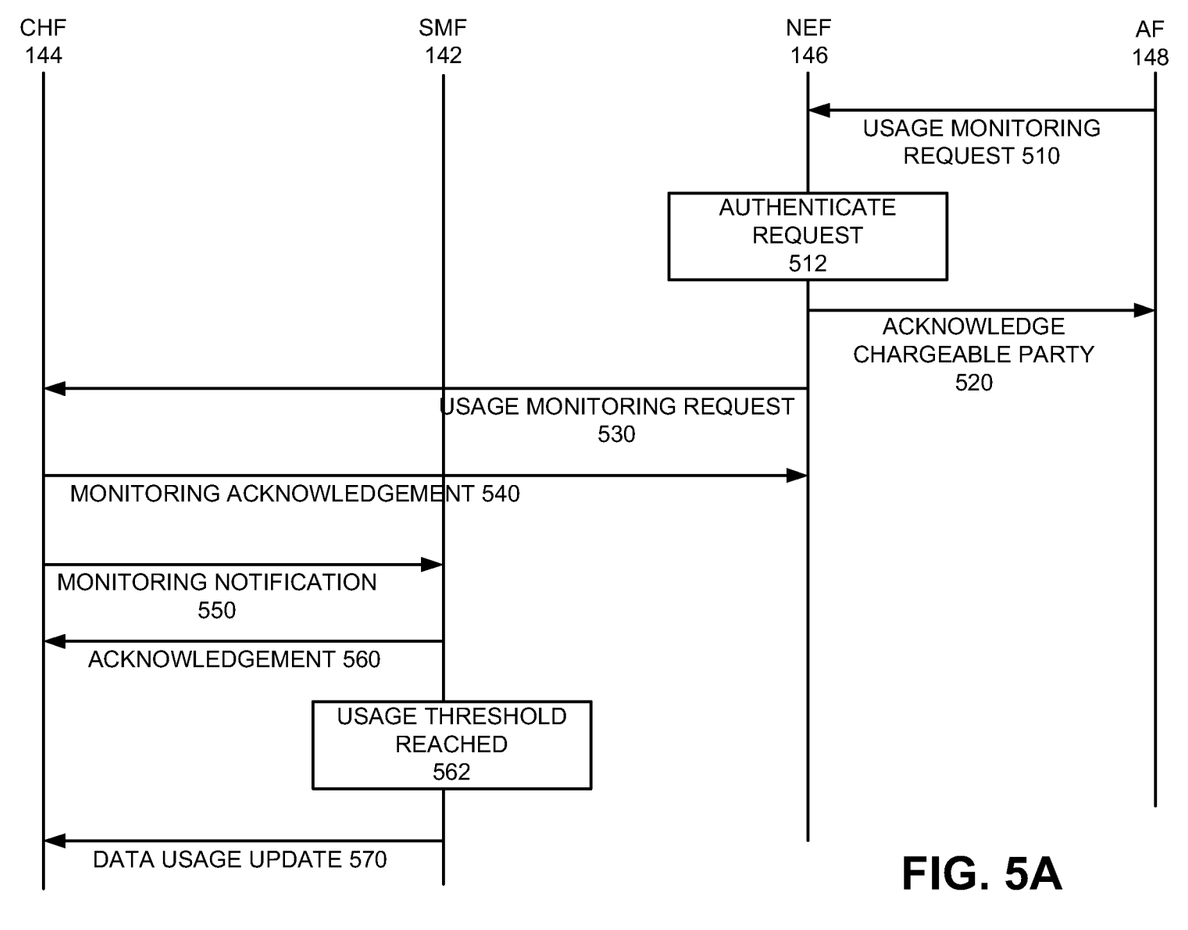
FIGS. 5A and 5B are exemplary signal flow diagrams associated with the processing of FIG. 4.
Figure 5B:
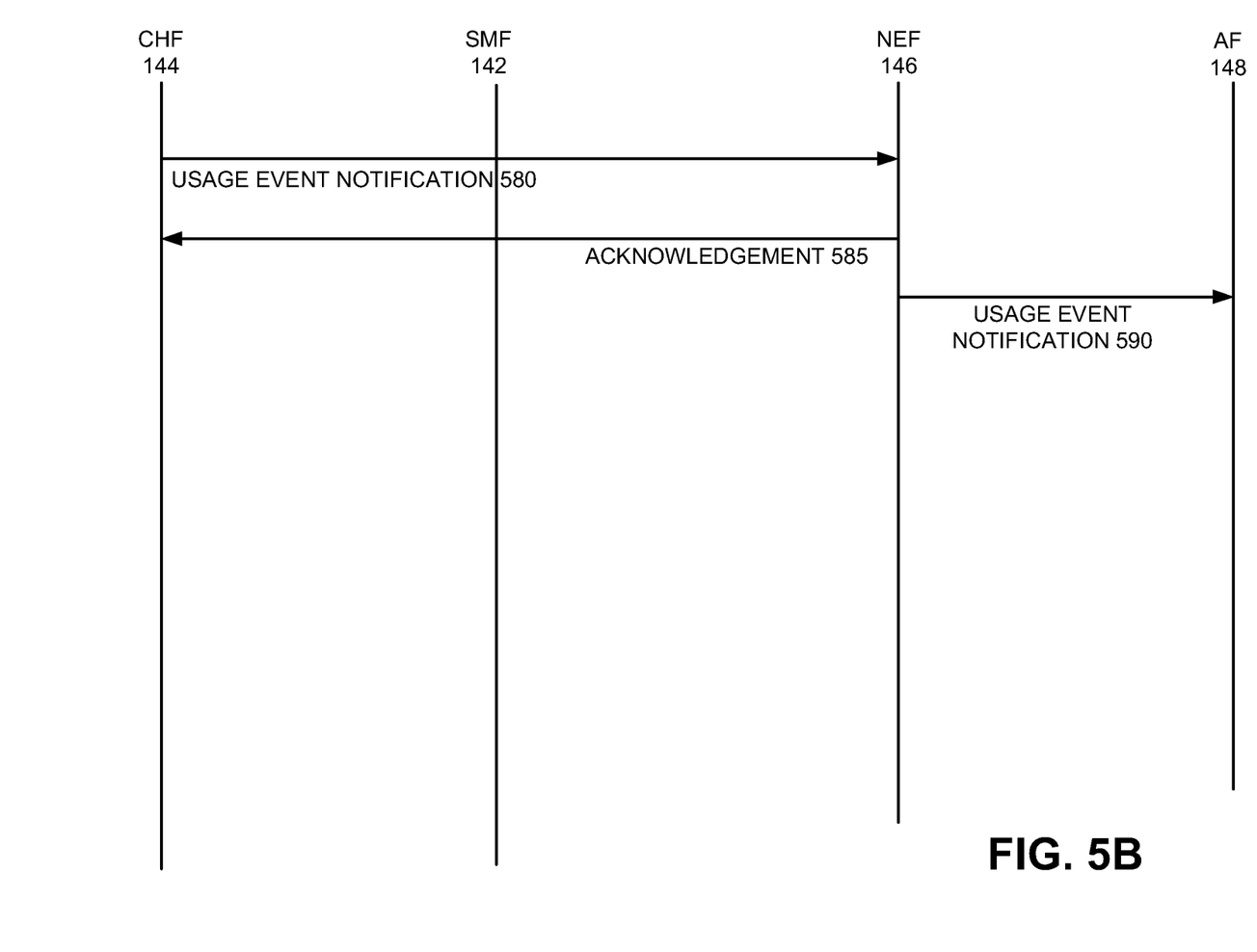

FIG. 4 is a flow diagram illustrating processing associated with network usage monitoring in accordance with an exemplary implementation. FIGS. 5A and 5B are signal flow diagrams illustrating exemplary signal flows associated with the processing of FIG. 4. Processing may begin with application service provider 160 interacting with the network service provider associated with operating the networks illustrated in environment 100, such as access network 120 and core network 130, and sending usage parameters to the network service provider.

For example, assume that application service provider 160 wishes to subsidize/pay for its customers' data usage of a particular application (e.g., Facebook, YouTube, etc.) provided by application service provider 160. In this case, assume that application service provider 160 determines that it will pay the costs associated with 100 megabytes (MB) of data usage per month for each customer while the customer is using the application. Application service provider 160 may forward the parameters associated with subsidizing/paying for data usage of its application to the service provider. The service provider receives the application usage parameters and may store this information in, for example, one or more network devices 140 (block 410). For example, the network service provider may store the data usage parameters identifying the particular amount of data for which application service provider 160 will pay for data usage in CIF 144, AF 148 and/or SMF 142.

Further assume that AF 148 sends a data usage monitoring request for the particular application associated with application service provider 160 to NEF 146 (block 420; FIG. 5A, 510). The data usage monitoring request may include information, such as the chargeable party information (e.g., information identifying application service provider 160), the amount of data usage to be charged to application service provider 160 (e.g., 100 MB per month), etc. In other instances, a data usage monitoring request may be sent by AF 148 to other elements in core network 130 and may not include chargeable party information.

Assume that NEF 146 receives the data usage monitoring request and authenticates the request (block 420; FIG. 5A, block 512). For example, NEF 146 identifies the chargeable party and determines if the chargeable party is authorized to pay for data usage for particular users. If the request is valid, NEF 146 sends an acknowledgement to AF 148 (FIG. 5A, 520). If the request is valid, NEF 146 also sends a data usage monitoring request to CIF 144 (block 430; FIG. 5A, 530). The data usage monitoring request may include information identifying the particular application associated with the request (e.g., Facebook, YouTube, etc.), a data usage threshold, a monitoring period (e.g., monthly, daily, continuous, etc.), a measurement type (MB, gigabytes (GB), etc.).

When CHF 144 receives the data usage monitoring request, CHF 144 may send a monitoring acknowledgement message to NEF 146 (FIG. 5A, 540). CHF 144 may also notify SMF 142 to enforce the data usage threshold, monitor the threshold periodically based on the monitoring period, monitor the data usage based on the measurement type, etc. (block 440; FIG. 5A, 550). SMF 142 may send an acknowledgement to CHF 144 (FIG. 5A, 560). The notification sent to SMF 142 may include at least the data usage monitoring parameters, such as information identifying the application associated with the data usage, the data usage threshold, the monitoring period, the data measurement type, etc.

Upon receipt of a data usage threshold enforcement request, SMF 142 may monitor the data usage in accordance with the received parameters (block 440). For example, SMF 142 may monitor data usage of particular users of the particular application provided by application service provider 160 and identified by monitoring notification 550, and determine if the data usage threshold for any of the users has been reached (block 450). If the data usage threshold has not been reached for the particular monitoring period (block 450—no), SMF 142 may continue to monitor data usage.

If, however, the data usage threshold has been reached (block 450—yes; FIG. 5A, block 562), SMF 142 may notify CHF 144 that a user has met the data usage threshold (block 460; FIG. 5A, 570). CHF 144 receives the data usage threshold notification and may store records associated with the data usage threshold notification for auditing or other purposes (block 460). CHF 144 also forwards a data usage event notification to NEF 146 (block 470; FIG. 5B, 580). Assume that NEF 146 receives the data usage events notification. NEF 146 may send an acknowledgement to CIF 144 (FIG. 5B, 585). NEF 146 may also forward the data usage event notification to AF 148 (block 470; FIG. 5B, 590). In some implementations, AF 148 may then forward the data usage event notification to application service provider 160 or forward the event notification information to application service provider 160 at the end of a billing cycle (e.g., monthly).

In this manner, the same network element (e.g., CIF 144 or a number of CHFs 144 distributed within environment 100) receives and stores data usage information contemporaneously with informing AF 148 (e.g., via NEF 146) of the data usage threshold being met. Since CHF 144 stores information regarding the data usage threshold associated with use of the application, CIF 144 may then be able to generate billing records for application service provider 160 based on the data usage associated with the particular application. For example, CIF 144 may generate data billing records for application service provider 160 that includes billing application service provider 160 for each predetermined amount of data used with respect to the particular application for each user per month or other period of time. This may help avoid any discrepancies or issues at a later time if application service provider 160 wishes to audit or check the data usage associated with the particular application. For example, CIF 144 may store records with time tags indicating when various data usage thresholds were met, as well as records with time tags indicating when data usage event notifications were forwarded to NEF 146 and AF 148.

Implementations described herein provide for data usage monitoring and reporting by a network element, such as CIF 144 in a core network. For example, CIF 144 may instruct other network elements to notify CIF 144 when a data usage threshold has been met and CIF 144 may then store data records associated with the data usage. CIF 144 may also notify other network elements, such as AF 148 of the data usage threshold being met. This may allow a network service provider to have a reliable and efficient mechanism for tracking data usage, while also avoiding any issues or discrepancies with respect to data usage monitoring and billing.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been described above with CIF 144 communicating with SMF 142 with respect to enforcing the data usage threshold and being notified when the data usage threshold has been met. In other implementations, CIF 144 may communicate with other network functions or elements in core network 130 to enforce the data usage threshold. In such implementations, CIF 144 may communicate with the UPF or other network function via signals similar to signals 550, 560 and 570 described above.

In addition, features have been described with respect to providing network usage monitoring using elements in core network 130. In other implementations, similar processing may be performed in other portions of environment 100, such as in a Multi-access Edge Computing (MEC) platform located, for example, between access network 120 and core network 130. In still other implementations, a number of CHFs 144 may be distributed in environment 100 to provide network usage monitoring as described above.

Further, while series of acts have been described with respect to FIG. 4 and signal flows with respect to FIGS. 5A and 5B, the order of the acts and signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, by a charging function (CHF), a data usage monitoring request associated with use of an application, wherein the data usage monitoring request identifies a data usage threshold;
   transmitting, by the CHF and to at least one of a session management function (SMF) or a user plane function (UPF), a message notifying the at least one of the SMF or UPF of the data usage threshold;
   receiving, from the at least one of the SMF or UPF, a notification that the data usage threshold has been reached;
   sending, by the CHF, a message to a network exposure function (NEF) indicating that the data usage threshold has been reached; and
   forwarding, by the NEF, a notification to an application function (AF) indicating that the data usage threshold has been reached.

2. The method of claim 1, further comprising:
   forwarding, by at least one of the NEF or AF, information identifying data usage associated with the application to an application service provider associated with the application.

3. The method of claim 1, further comprising:
   storing, by the CHF, data associated with the data usage threshold being reached.

4. The method of claim 3, wherein the storing comprises:
   storing records indicating an amount of data usage and a time associated with the data usage threshold being reached.

5. The method of claim 1, further comprising:
   receiving, by the NEF, the data usage monitoring request; and
   forwarding, by the NEF, the data usage monitoring request to the CHF.

6. The method of claim 5, further comprising:
   determining, by the NEF, whether the data usage monitoring request is valid.

7. The method of claim 1, wherein the data usage monitoring request comprises information identifying a period associated with monitoring data usage.

8. The method of claim 7, wherein the data usage monitoring request comprises information identifying a data measurement type.

9. The method of claim 1, wherein the data usage monitoring request comprises information identifying a chargeable party associated with use of the application.

10. A system, comprising:
    at least one device configured to:
      receive a data usage monitoring request associated with use of an application, wherein the data usage monitoring request identifies a data usage threshold,
      transmit to at least one of a session management function (SMF) or a user plane function (UPF), a message notifying the at least one of the SMF or UPF of the data usage threshold,
      receive, from the at least one of the SMF or UPF, a notification that the data usage threshold has been reached,
      send a message to a network exposure function (NEF) indicating that the data usage threshold has been reached, and
      forward a notification to an application function (AF) indicating that the data usage threshold has been reached.

11. The system of claim 10, wherein the at least one device comprises a charging function (CHF), the NEF and the AF.

12. The system of claim 11, wherein the NEF is configured to:
    forward the notification to the AF.

13. The system of claim 11, wherein the AF is further configured to:
    forward information identifying data usage associated with the application to an application service provider associated with the application.

14. The system of claim 10, wherein the at least one device is further configured to:
    store data records associated with the data usage threshold being reached, wherein the data records indicate an amount of data usage and a time associated with the data usage threshold being reached.

15. The system of claim 10, wherein the at least one network device comprises the NEF and a charging function (CHF), and wherein the NEF is configured to:
    receive the data usage monitoring request, and
    forward the data usage monitoring request to the CHF.

16. The system of claim 15, wherein the NEF is further configured to:
    determine whether the data usage monitoring request is valid.

17. The system of claim 10, wherein the data usage monitoring request comprises information identifying a period associated with monitoring data usage.

18. A non-transitory computer-readable medium having stored thereon sequences of instructions which, when executed by at least one processor, cause the at least one processor to:
    receive a data usage monitoring request associated with use of an application, wherein the data usage monitoring request identifies a data usage threshold;
    transmit to at least one of a session management function (SMF) or a user plane function (UPF), a message notifying the at least one of the SMF or UPF of the data usage threshold;
    receive, from the at least one of the SMF or UPF, a notification that the data usage threshold has been reached; and
    send a message to a network exposure function (NEF) indicating that the data usage threshold has been reached, wherein the NEF is configured to forward a notification to an application function (AF) based on the message.

19. The non-transitory computer-readable medium of claim 18, wherein the instructions further cause the at least one processor to:
    store data records associated with the data usage threshold being reached, wherein the data records indicate an amount of data usage and a time associated with the data usage threshold being reached.

20. The non-transitory computer-readable medium of claim 18, wherein the data usage monitoring request comprises information identifying a period associated with monitoring data usage.

* * * * *